April 28, 1953 R. W. WILLIAMS 2,636,211
BALL BEARING HINGE
Filed Aug. 5, 1947
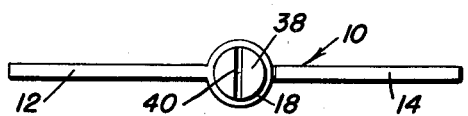
Fig. 2.
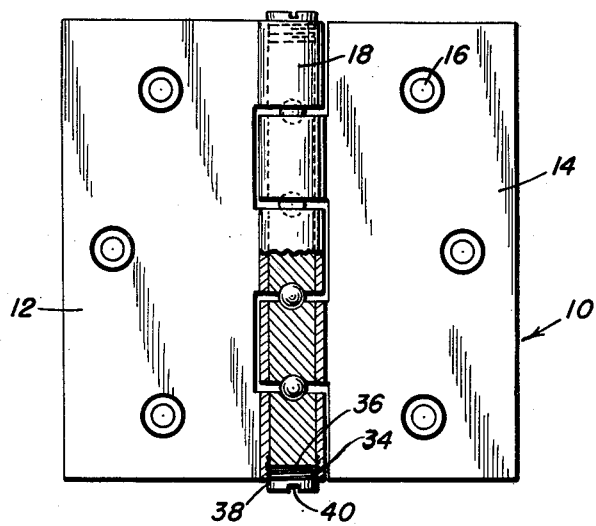
Fig. 1.
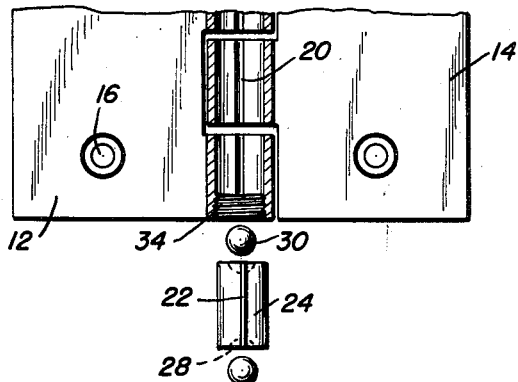
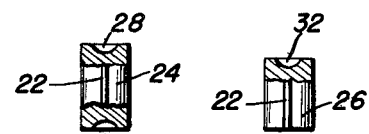
Fig. 4. Fig. 5.
*Inventor*
Roy William Williams
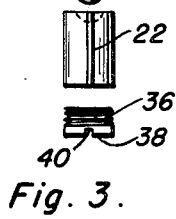
Fig. 3.
By *Clarence A. O'Brien and Harvey B. Jacobson*
*Attorneys*

Patented Apr. 28, 1953

2,636,211

UNITED STATES PATENT OFFICE 2,636,211

BALL BEARING HINGE

Roy William Williams, Waverly, Iowa

Application August 5, 1947, Serial No. 766,347

1 Claim. (Cl. 16—136)

This invention relates to new and useful improvements in ball bearing hinges and the primary object of the present invention is to provide a door hinge including novel and improved intermeshed knuckles so designed as to be self lubricating thereby eliminating the necessity of having to apply a lubricant to the same at any time.

Another important object of the present invention is to provide a pair of plates having interdigitated sleeves and including pintle sections slidably mounted in the sleeves that remain in a non-rotatable position to the sleeves during pivotal movement of one of the plates relative to the other.

A further object of the invention is to provide a hinge including a pair of plates having intermeshed knuckles that are spaced relative to each other to reduce the normal friction prevalent as the hinge is actuated.

A still further aim of the present invention is to provide a ball bearing hinge that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of the present hinge, and with parts broken away and shown in section;

Figure 2 is a top plan view of Figure 1;

Figure 3 is a fragmentary front elevational view of the hinge showing the pintle, ball bearings and closure plug spaced relative to the sleeves and with parts of the hinge broken away and shown in section;

Figure 4 is a front elevational view of one of the intermediate pintles, and with parts broken away and shown in section; and Figure 5 is a front elevational view of one of the end pintles, and with parts broken away and shown in sections.

Referring now to the drawings in detail, wherein for the purpose of illustration, there is disclosed a preferred embodiment of the present invention, the numeral 10 represents the hinge generally comprising a first member or door plate 12 and a second member or frame plate 14. Each of these plates is provided with a suitable number of countersunk apertures 16 through which screws or the like may be passed into a door and a frame to secure the hinge in position thereto.

Integrally formed with the adjacent longitudinal edges of the plates are spaced cylindrical knuckles or sleeves 18 that are intermeshed or interdigitated with respect to each other. It should be noted, that the adjacent ends of the sleeves are spaced slightly relative to each other, as shown in Figure 1, for a purpose which will be more fully later described.

Formed in the inner periphery of each of these sleeves 18, are keyways or longitudinal grooves 20 that slidably engage longitudinal ribs or keys 22 projecting outwardly from the outer periphery of intermediate pintle sections 24 and end pintle sections 26. At each end of the intermediate pintle sections 24 there is provided a ball seat 28 in which are frictionally engaged ball bearings 30. Also, the inner ends of the end pintles 26 are provided with ball seats 32 for engaging the ball bearings carried by the seats of the intermediate sections adjacent the seats 32.

The outermost sleeves of the plate 12, are internally threaded as at 34 to receivably engage the threaded portions 36 of closure plugs 38 provided with kerfs 40 that engage a suitable tool for adjustment of the plugs within the sleeve to selectively position the pintle sections within the sleeves.

It should be noted, that the adjacent ends of the pintle sections are also spaced relative to each other as are the sleeves 18, so that during pivotal movement of plate 14 relative to plate 12, there will be only the friction of the ball bearings 30 within the seats 28 and 32 that will affect the hinge.

It is also preferred, that these pintle sections 24 and 26 be formed from a lubricating material into their cylindrical shape.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A ball bearing hinge comprising a pair of leaves having rolled cylindrical sleeves interdigitated with each other, juxtapositioned pintle sections slidably mounted in said sleeves, there being a single pintle section in each sleeve, said sections being of solid lubricating material and having concaved ball seats in their adjacent ends, ball bearings positioned in adjacent seats, said sleeves including a pair of end sleeves, means threaded in said end sleeves for adjusting said sections as a unit longitudinally of said sleeves, each of said pintle sections having a rib extending throughout their length, and said sleeves having longitudinal grooves in their inner peripheries receiving said ribs.

ROY WILLIAM WILLIAMS.

References Cited in the file of this patent

UNITED STATES PATENTS

| Number | Name | Date |
|---|---|---|
| 1,076,689 | McKinney | Oct. 28, 1913 |
| 1,156,765 | Ely | Oct. 12, 1915 |
| 1,169,566 | Prieskorn | Jan. 25, 1916 |
| 2,090,569 | Bagley | Aug. 17, 1937 |
| 2,214,348 | Roth | Sept. 10, 1940 |
| 2,255,529 | May | Sept. 9, 1941 |